US008254554B2

(12) United States Patent
Noldus

(10) Patent No.: US 8,254,554 B2
(45) Date of Patent: Aug. 28, 2012

(54) TELEPHONE DIRECTORY ASSISTED DIALING WITH AUTOMATIC CALL CONNECT BY EITHER AN INTERMEDIATE NETWORK NODE OR THE CALLING PARTY'S TERMINAL

(75) Inventor: Rogier August Caspar Joseph Noldus, Goirle (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1091 days.

(21) Appl. No.: 12/094,508

(22) PCT Filed: Nov. 24, 2005

(86) PCT No.: PCT/EP2005/012692
§ 371 (c)(1),
(2), (4) Date: May 21, 2008

(87) PCT Pub. No.: WO2007/059792
PCT Pub. Date: May 31, 2007

(65) Prior Publication Data
US 2009/0003571 A1    Jan. 1, 2009

(51) Int. Cl.
*H04M 1/00* (2006.01)
(52) U.S. Cl. .......... 379/265.01; 379/355.04; 379/218.01
(58) Field of Classification Search ............. 379/265.01, 379/355.04, 218.01
See application file for complete search history.

(56) References Cited

U.S. PATENT DOCUMENTS

| 5,873,032 A * | 2/1999 | Cox et al. ............ 455/417 |
| 6,944,283 B1 * | 9/2005 | Klein ............ 379/355.04 |
| 2003/0181223 A1 | 9/2003 | Lee et al. |

FOREIGN PATENT DOCUMENTS

| EP | 0 178 111 A | 4/1986 |
| EP | 0 550 975 A | 7/1993 |
| WO | WO 01/10101 A | 2/2001 |

* cited by examiner

*Primary Examiner* — Ahmad Matar
*Assistant Examiner* — Jirapon Intavong

(57) ABSTRACT

The application relates to a network assisted calling service comprising a service call to an assistance entity which translates an indication of a destinatin party into a destination identifier which is subsequently used for the establishment of a user call between the calling and the destination party. In the prior art the user call has either to be set up manually by the calling terminal or it is set up by the network node to which the assistance entity is connected which suffers from disadvantages with respect to routing, complex charging schemes, etcetera. In the method of the invention, this is resolved by said destination identifier being returned through a signalling channel associated with the operative connection. The destination identifier is either returned to the calling party's terminal (C) or is returned to a network node (N). Either the terminal (C) or the network node (N) subsequently set up the user call.

21 Claims, 2 Drawing Sheets

TELEPHONE DIRECTORY ASSISTED DIALING WITH AUTOMATIC CALL CONNECT BY EITHER AN INTERMEDIATE NETWORK NODE OR THE CALLING PARTY'S TERMINAL

FIELD OF THE INVENTION

The present invention is related to a method and assistance entity for providing a network assisted calling service to a calling party in a telecommunications network, wherein said network assisted calling service is facilitated through an assistance entity in said network.

BACKGROUND OF THE INVENTION

In order to provide communication services using a telecommunications network, operators of telecommunications network are offering network services that assist subscribers with call establishment. Examples of such services include voice assisted dialing, and directory assisted dialing, the latter either with or without automatic call connect. These services entail that the subscriber dials a service number, and is connected to the network service or assistance entity facilitating the service. The subscriber may, in case of voice assisted dialing, pronounce the number or, in case of directory assisted dialing, pronounce the name of the desired destination party. The network service then retrieves the required destination identifier (e.g. telephone number) of the destination party, and dependent on the service either returns the destination identifier to the calling party, or (in case of automatic call connect and voice assisted dialing) connects the calling party to the destination party, or both.

The above described services suffer from a number of disadvantages as will be explained below.

In case of voice assisted dialing, or directory assisted dialing with automatic call connect, a disadvantage of these services is that the routing of the call through the telecommunications network is not performed in an efficient manner. The call is typically routed from a network node to which the assistance entity is connected, or from which the network service is initiated. From this network node, the call is routed or forwarded to the required destination. It is noted that rerouting of the call from this network node, is not necessarily the most efficient path through the network. To give an example, suppose the calling party and the destination party are connected to the same local network node, and the assistance entity facilitating the service is connected to a remote network node, the call from the calling party to the destination party is routed from the local network node, to the remote network node, back to the local network node, and to the destination party. In this case, the call is using the branch between the local network node and the remote network node twice (to and from the remote network node), while the most efficient routing of the call would not even use this branch (in fact would not use any branch in the network).

Another disadvantage of the voice assisted calling service or directory assisted calling service with automated call connect, is that charging of these call becomes unnecessarily complex on behalf of the network operator. In particular where the calling party is, for example, a prepaid subscriber, the local network node will only know the dialled number which is the service number. The eventual destination of the call between the calling party and the destination party is unknown, and this problem has to be resolved at a later stage in order to effectively charge the call.

Other, similar services include for example directory assistance calling without automatic call connect. In this case, the calling party establishes an operative connection with the assistance entity, and provides the assistance entity with (for example) the name of the destination party. The assistance entity returns the destination number to the calling party, either by mentioning the destination number to the calling party using an open voice service call, or differently by sending an SMS-message (Short Messaging Service (SMS)) to the calling party including the destination number.

A disadvantage of this type of service is that, where the destination number is provided through an ongoing voice service call, e.g. by pronouncing the destination number, the user has to memorize the destination number and subsequently dial the number on his telephone. Not only is this cumbersome to the calling party, but in case of a communicational error (e.g. the user has misinterpreted the destination number as it is pronounced), setting up the call may fail. Even a step of writing down the destination number does not completely eliminate this risk.

On the other hand, there where the destination number is provided by sending a short messaging service-message (SMS-message), a disadvantage is that the transmission of an SMS-message puts an additional demand on the network resources, since it is an additional communication service to be provided through the telecommunications network.

Another disadvantage of sending the destination number by SMS, is that for establishing a call to the destination party, user intervention is required. The SMS must be opened by the user, and the destination number must be called by the user.

FURTHER DISADVANTAGE OF SMS

Summary of the Invention

It is an object of the present invention to provide a network assisted calling service which overcomes the problems and disadvantages of the prior art, which uses the available network resources in an optimal manner, and which enables automatically establishing the desired call.

This object is achieved by the present invention in that there is provided a method of providing a network assisted calling service to a calling party in a telecommunications network, wherein said network assisted calling service is facilitated through an assistance entity in said network, said method comprising the steps of: establishing an operative connection between said calling party and said assistance entity through said network; said calling party providing an indication of a destination party to said assistance entity; said assistance entity determining a destination identifier based on said indication for identifying said destination party in said network; and said assistance entity returning said destination identifier, wherein said destination identifier is returned through a signalling channel associated with said operative connection.

Signalling channels in the telecommunications network are designed and used for exchanging internal instructions between different nodes and entities on the network. By returning the destination identifier through a signalling channel, the destination number is received by any entity (such as a network node, a connected terminal, or any other entity) which receives the instructions in the signalling channel. Since network entities are designed to actively respond to instructions transmitted through the signalling channel, the transmission of the destination identifier through the signalling channel also enables automatically connecting a calling party to the destination party identified by the destination identifier. This may be performed by any of the entities connected to the network which receives the destination identifier through the signalling channel. Therefore, routing of a subsequent call to a destination party may be performed from any entity receiving the destination identifier, e.g. a local network node to which the calling party is connected. Network resources can be used in the most efficient manner.

In accordance with an embodiment of the invention, the method further comprises a step of establishing a user call between the calling party and the destination party, using the destination identifier. As will be appreciated, this is the most preferred solution, although it is not an essential step of the method of the invention described. Alternatively, the user call between the calling party and the destination party is not automatically established, but the destination identifier may simply be forwarded to the terminal station of the calling party (this will be described herein below). The calling party may then at any time still decide to call the destination party while, for example, the destination identifier is automatically stored in the memory of the terminal station.

In accordance with another embodiment of the invention, the operative connection between the calling party and the assistance entity is established through one or more switching nodes in the network, and the destination identifier is returned to at least one of said network nodes. In particular, this enables routing from a subsequent user call between the calling party and the destination party from any of the intermediate network node involved in the operative connection between the assistance entity and the calling party.

Therefore, in accordance with another embodiment of the invention, the destination identifier which is sent through said signalling channel, is accompanied by a reconnect instruction for establishing the user call. This reconnect instruction may be intended for any of the switching nodes involved, enabling it to setup the call with the destination party.

According to yet another embodiment the user call is established by the at least one switching node upon receiving of the destination identifier. The network node may automatically connect the calling party to the destination party when the destination identifier is received.

It will be appreciated that with the method described above, an assisted calling service with automated call connect may be established, which does not suffer from any of the disadvantages of the prior art.

According to yet another embodiment, the destination identifier is returned to a terminal station of the calling party, as was already described herein above. This enables the terminal station to store the destination identifier in its memory, or (alternatively or in addition) inform the calling party of the received destination identifier, in accordance with another embodiment.

The terminal station may also be arranged for establishing the user call after the destination identifier is received. It will be understood that the destination identifier received through the signalling channel may easily be used by the terminal station to setup the call to the destination party automatically. An advantage of this solution is that in the telecommunications network, the call to the assistance entity and the call to the destination party may easily be identified as independent calls over the telecommunications networks, simplifying the charging structure to be applied for both calls. As will be appreciated, if automatic dialing of the destination party is not desired, the terminal station may be designed for prompting the calling party prior to setting up the user call. This enables the user to make the user call to the destination party at any suitable point in time.

The destination identifier may be included in an already existing signalling message being exchanged between network nodes in relation to the operative connection between the calling party and the assistance entity. In accordance with an embodiment the signalling message comprises a release connection message sent by said assistance entity for ending the operative connection. Setting up the user call to the destination party may be performed directly in response to receipt of the release connection message. More generally the destination identifier is returned on ending of the operative connection.

The telecommunications network may be any of a group comprising a mobile telecommunications network, or a fixed telecommunications network. The user call may include any element of a group comprising a voice telephony call, a video telephony call or a data exchange call.

It is particularly noted, that the operative connection between the calling party and the assistance entity may be facilitated through a service call, and that the service call may be a voice telephony call, a video telephony call, a data exchange call, or the like. The service call to the assistance entity may be of a different type than the user call between the calling party and the destination party.

In accordance with the second aspect of the present invention, there is provided an assistance entity for use in a method as described above, comprising means for establishing an operative connection with a calling party through a telecommunications network, means for receiving an indication of a destination party, means for providing a destination identifier based on said indication received, and means for returning said destination identifier, wherein said means for returning said destination identifier is arranged for returning said identifier through a signalling channel.

In particular the means for providing the destination identifier may comprise a database for storage of party information of a plurality of connected parties of the telecommunications network. It is noted, as the skilled person will appreciate, that the invention is not limited to providing connections between parties having a subscription with a single telecommunications provider. A database as described above may comprise party information from parties connected to a plurality of interconnected networks.

In accordance with yet another embodiment, the assistance entity further comprises means for forming a query for querying the database mentioned herein above, wherein the means for forming a query comprises at least one element of a group comprising automatic querying means arranged for automatically forming a query based on said indication provided by said calling party, or operator controlled querying means arranged for receiving an input from an operator and forming a query based on this input. Said input provided by said operator, if said operator controlled querying means, comprises said indication received by said operator from said calling party.

In accordance with a third aspect, there is provided a switching node for use in a method as described herein above, said switching node comprising means for establishing an operative connection between a calling party and an assistance entity, means for receiving a destination identifier from said assistance entity through a signalling channel associated with the operative connection, and means for establishing a user call between said calling party and a destination party identified by said destination identifier.

The invention will now further be elucidated by means of specific examples, with reference to the enclosed drawings. It is noted that the detailed description of the example is only provided for explanatory purposes only, and does not limit the scope of the invention, which scope is determined by the independent claims.

DETAILED DESCRIPTION OF THE DRAWINGS

Figure 1:
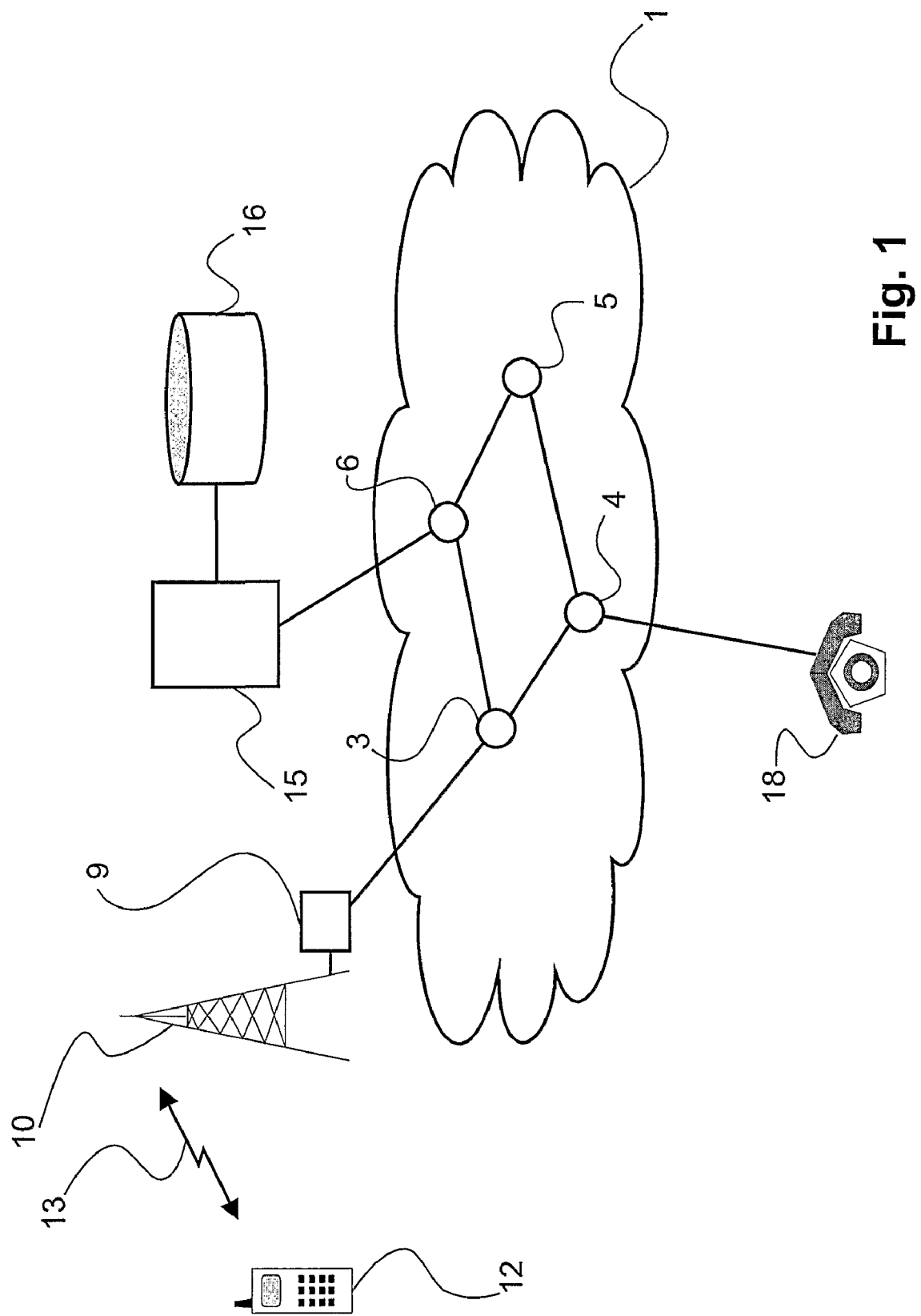
FIG. 1 is the schematic illustration of an arrangement for performing the method of the present invention.

FIG. 1 schematically shows a telecommunications network 1 comprised of a plurality of network nodes 3, 4, 5, 6. A calling party, schematically indicated with terminal unit 12, is enabled to establish a mobile connection 13 with a radio communication unit 10. The radio communication unit 10 is connected to a base station 9, which in its turn is connected to network node 3. To network node 6, there is connected an assistance entity 15 arranged for facilitating a directory assisted calling service using the telecommunications network 1. The assistance entity 15 is operatively connected to a database 16 comprising information regarding a plurality of parties connected to, or reachable through the telecommunications network 1. To network node 4 there is connected an intended destination party having a regular fixed phone terminal unit 18.

Using a method of the present invention, a network provider may provide a directory assisted calling service through the telecommunications network 1, using assistance entity 15. Using the service, a calling party uses his terminal unit 12 to connect through wireless connection 13, radio communication unit 10 and base station 9 to network node 3, connecting further to network node 6 and assistance entity 15. An operative connection between terminal unit 12 and assistance entity 15 is hereby established. The calling party may for instance pronounce the name of the destination party through a regular voice based service call to the assistance entity 15. The assistance entity 15 may look up the destination identifier in database 16.

According to the invention, the destination identifier retrieved from the database 16 is included in a signalling message and is sent along a signalling path associated with the operative connection between the terminal unit 12 and the assistance entity 15. For example, upon termination of the service call between the assistance entity 15 and the calling party 12, the destination identifier may be included in a release connection signalling message which is sent along the network back to calling party 12, to inform all of the network nodes 3, 6 and the base station 9 of the termination of the service call.

In accordance with the invention, the destination identifier may either be sent to any of the network nodes involved in the communication, such as network nodes 3 or 6, or may be forwarded back to the termination unit 12 of the calling party. This will be described below.

Figure 2:
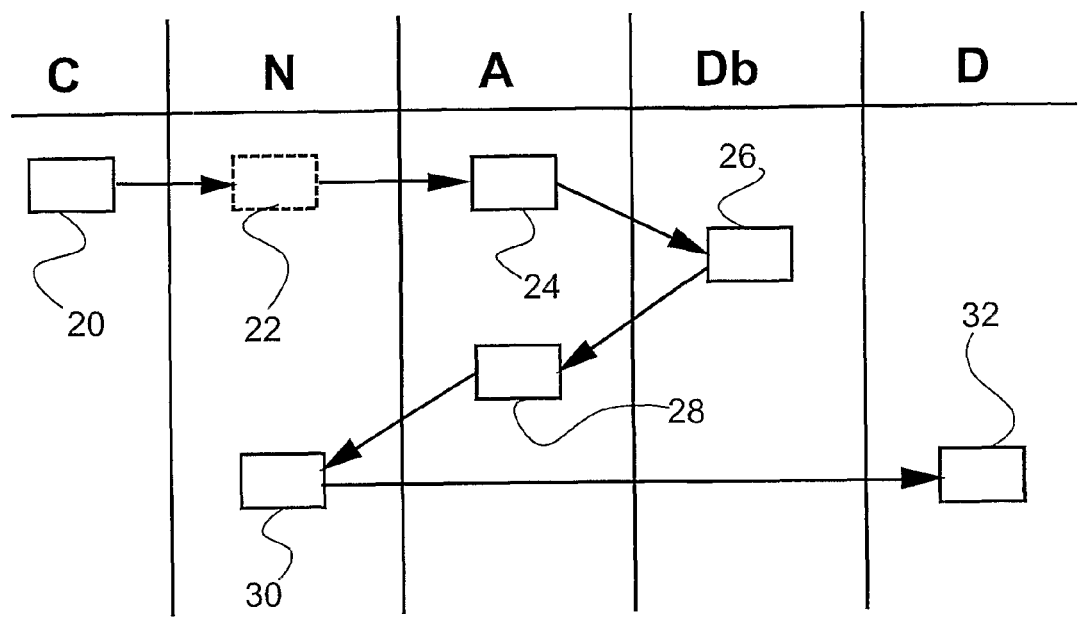
FIG. 2 schematically illustrates an embodiment of the method of the present invention.

In FIG. 2, the method of the present invention is schematically illustrated. The table of FIG. 2 comprises five columns, indicated with the letters C, N, A, Db, and D. Steps performed at the calling party are found in column C. Steps performed at any of the intermediate network nodes, such as network nodes 3 and 6 of network 1 in FIG. 1, can be found in column N. Steps performed at the assistance entity can be found in column A. Steps performed by the database, such as database 16 of FIG. 1, can be found in the column indicated with Db, and steps performed at the destination party are found in column D.

The method of the present invention is initiated by the calling party C which is trying to establish a connection with assistance entity A in step 20. Although the calling party C will generally not notice the involvement of any of the network nodes (as is indicated by the dotted block 22), the operative connection between the calling party C and the assistance entity A is established through the network node N as is indicated in block 22. The assistance entity 24 answers the service call with calling party C in step 24, and receives from the calling party C an indication of the destination party D desired. This indication may be a name of the destination party D, or any other suitable indication such as address information. The assistance entity A consults database Db, which in step 26 provides a destination identifier to assistance entity A. The assistance entity A is step 28 includes the destination identifier in a release connection signalling message, and as a result terminates the service call which was setup by calling party C.

The release connection message is received by one of the network nodes N, e.g. network node 3 of FIG. 1. In an intelligent network (IN), the release connection message may be notified by the assistance entity in interrupt mode, in which case the call release is notified back through the telecommunications network, but not completely back to the termination unit, such that a connection between the termination unit and any of the desired network nodes, such as network node 3, remains active. The network node N, such as network node 3, in step 30 establishes the connection with the destination party D, based on the destination identifier received from the assistance entity A.

It is noted that using a method according to FIG. 2, it is even possible to connect the calling party C to the destination party D, without revealing the destination identifier of destination party D to calling party C. A benefit of this is that destination party D may use a secret destination number or telephone number, and does not want to provide his destination identifier to any third party. The destination party D may however give his consent to receiving incoming user calls that have been established using a directory assisted calling service through assistance entity A. In other words, the calling party C will never be informed of the destination identifier for destination party D, however destination party D can be reached by any party if use is made of the directory assisted calling service through assistance entity A. Optionally, identification information of calling party C which is trying to reach destination party D may in this case be recorded by assistance entity A, and optionally destination party D may notify assistance entity A of any party for which a connection with destination party D should preferably not be established.

Figure 3:
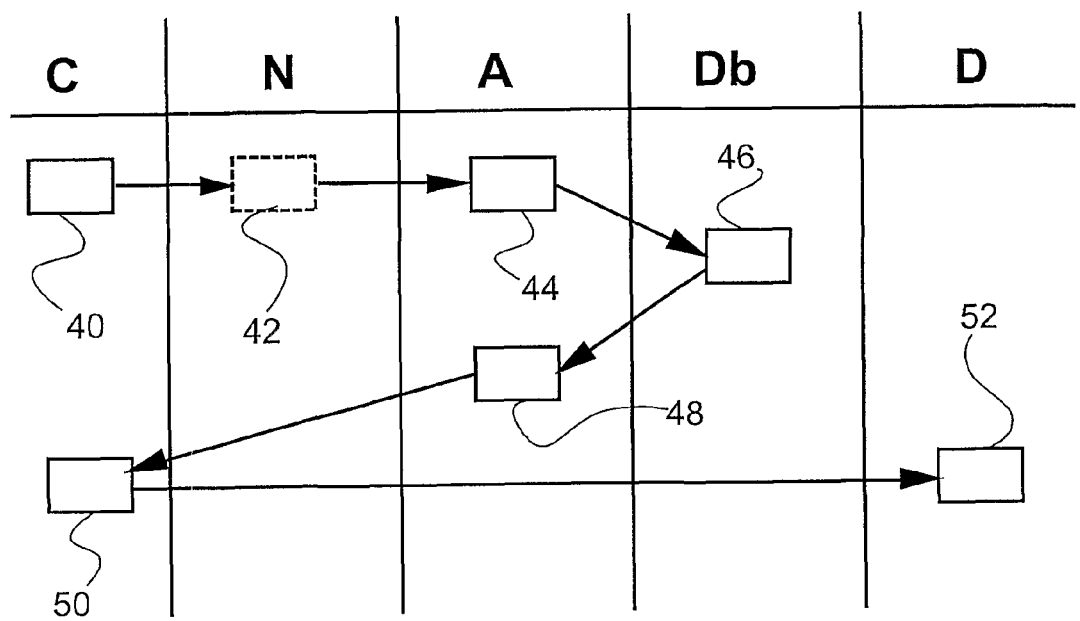
FIG. 3 schematically illustrates an embodiment of the present invention.

FIG. 3 schematically illustrates another embodiment of the method of the present invention. The columns of the table in FIG. 3 carry the same references C, N, A, Db, D as in FIG. 2, indicating the same or similar parties. In the method of FIG. 3, the calling party establishes in step 40, through network node N (in step 42) a connection with a assistance entity A. In step 44, the assistance entity A receives an indication of the destination part D from calling party C, and consults database Db. The database Db in step 46 returns the destination identifier to the assistance entity A. The assistance entity A in step 48 includes the destination identifier in a signalling message, such as a release connection message, through the signalling channel associated with the operative connection between calling party C and assistance entity A. This release connection method, including the destination identifier, is received in step 50 by calling party C, which automatically terminates the connection with assistance entity A and establishes a user call with destination party D in step 50. Destination party D in step 52 receives the incoming user call and answers it, such that the user call is established.

Optionally, instead of automatically setting up the call between the terminal unit of calling party C and the destination party D, the terminal unit, such as terminal unit 12 of FIG. 1, may prompt the calling party using the terminal unit whether or not the call should be established immediately, or whether the destination identifier should be stored for later use. This has the advantage that the calling party C is in complete control of the situation.

The feature of receiving the destination identifier through the signalling channel and establishing automatically a connection with the destination party, may not be a standard feature of the terminal unit used by the calling party C for establishing the connection. In particular, a software application may be loaded in the memory of the terminal unit of calling party C that enables the terminal unit to perform this function. In this case, the assistance entity A should by default make use of a method such as is described in relation to FIG. 2, wherein the network node establishes the connection with destination party D. The terminal unit of the calling party C may, upon setting up the operative connection with assistance entity A, include an indication that it is capable of performing the function of setting up a connection, if the destination identifier is forwarded to the terminal unit through a signalling message. The method described in relation to FIG. 3, is in that case, only performed when the terminal unit of the calling party C is capable of performing that function.

The embodiment of the method according to the invention which is described in relation to FIG. 3 has multiple advantages. One of the advantages of this embodiment is that a complete new communication session is provided in addition to the service call to the assistance entity. This not only enables a much more convenient and simple charging scheme for the network provider, but it also enables the use of numerous value added services provided by the network provider in relation to the establishment of calls through the network. Examples of these are the performing of call barring checks, number translation, etc.

A specific advantage of the method as described in relation to FIG. 3, is related to the situation wherein the operative connection with the assistance entity is performed using a service call of a different type than the user call to be established between the calling party and the destination party. For example, when the calling party C uses a regular voice based service call to provide the assistance entity A with the indication of the destination party D, whereas the calling party C desires to setup a video telephony call with the destination party D, the service call to the assistance entity A may be routed via network bearers that are not capable of supporting video conferences. In that case, since the destination identifier is returned to the terminal unit of the calling party C, and since an independent user call has to be set up subsequent to terminating the service call, the telecommunications network will automatically select a suitable bearer, with a suitable bearer capability, for setting up the video telephony call.

It will be appreciated by the persons skilled in the art that numerous modifications and variations in the light of the above teachings belong to the possibilities for implementing the invention. It is noted that the scope of the invention is only limited by the scope of the appended claims.

The invention claimed is:

1. Method of providing a network assisted calling service to a calling party in a telecommunications network, wherein said network assisted calling service is facilitated through an assistance entity in said network, said method comprising the steps of:
   establishing an operative connection between said calling party and said assistance entity through said network;
   said calling party providing to said assistance entity an indication of a destination party;
   if a terminal unit of said calling party is capable of automatically setting up a connection in response to receiving a destination identifier from the assistant entity, the terminal unit providing an indication of said capability of said terminal unit to said assistance entity;
   said assistance entity determining the destination identifier based on said indication for identifying said destination party in said network; and
   said assistance entity returning said destination identifier, wherein said destination identifier is returned to said terminal unit through a signaling channel associated with said operative connection if said terminal unit is capable of automatically setting up said connection.

2. Method according to claim 1, further comprising a step of establishing a user call between said calling party and said destination party using said destination identifier.

3. Method according to claim 1, wherein said calling party is informed of said destination identifier by said terminal station.

4. Method according to claim 2, wherein said user call is established by said terminal station after receiving said destination identifier.

5. Method according to claim 4, wherein said calling party is prompted by said terminal station for establishing said user call.

6. Method according to claim 1, wherein said destination identifier is included in a signaling message.

7. Method according to claim 6, wherein said signaling message comprises a release connection message sent by said assistance entity for ending said operative connection.

8. Method according to claim 1, wherein said destination identifier is returned on ending of said operative connection.

9. Method according to claim 1, wherein said telecommunications network is an element comprising a mobile telecommunications network, or a fixed telecommunications network.

10. Method according to claim 2, wherein said user call is an element selected from a group comprising a voice telephony call, a video telephony call, and a data exchange call.

11. Method according to claim 1, wherein said operative connection between said calling party and said assistance entity is facilitated through a service call between said calling party and said assistance entity, said service call being an element selected from a group comprising a voice telephony call, a video telephony call, and a data exchange call.

12. Method according to claim 1, wherein if the terminal unit is not capable of automatically setting up a connection in response to receiving said destination identifier then said assistance entity sends the destination identifier to a network node, where the network node then establishes a connection in response to receiving said destination identifier.

13. Assistance entity for providing a network assisted calling service to a calling party in a telecommunications network, the assistance entity comprising:
   means for establishing an operative connection with a terminal unit of a calling party through a telecommunications network,
   means for receiving an indication of a destination party,
   means for receiving another indication from the terminal unit of said calling party, wherein the terminal unit sends the another indication if the terminal unit is capable of automatically setting UP a connection in response to receiving a destination identifier from the assistant entity, means for providing the destination identifier based on said indication received, and means for returning said destination identifier, wherein said means for returning said destination identifier is arranged for returning said identifier to the terminal unit through a signaling channel associated with the operative connection if said terminal unit is capable of automatically setting up said connection.

14. Assistance entity according to claim 13, wherein means for returning said destination identifier is arranged for returning said identifier on ending said received operative connection.

15. Assistance entity according to claim 13, wherein said means for providing said destination identifier comprises a database for storage of party information of a plurality of connected parties of said telecommunications network.

16. Assistance entity according to claim 15, further comprising means for forming a query for querying said database, wherein said means for forming a query comprises at least one element of a group comprising automatic querying means arranged for automatically forming a query based on said indication provided by said calling party, or operator controlled querying means arranged for receiving an input from an operator and forming a query based on said input.

17. Assistance entity according to claim 13, wherein means for returning said destination identifier is arranged for sending the destination identifier to a network node, where the network node then establishes a connection in response to receiving said destination identifier if the terminal is not capable of automatically setting up a connection in response to receiving said destination identifier.

18. A method of providing a network assisted calling service to a calling party in a telecommunications network, the method implemented by an assistance entity comprising the steps of:

establishing an operative connection with a terminal unit of the calling party through the telecommunications network;

receiving an indication of a destination party;

receiving another indication from the terminal unit of said calling party, wherein the terminal unit sends the another indication if the terminal unit is capable of automatically setting UP a connection in response to receiving a destination identifier from the assistant entity;

providing the destination identifier based on said indication received; and returning said destination identifier to the terminal unit through a signaling channel associated with the operative connection if said terminal unit is capable of automatically setting up said connection.

19. Method according to claim 18, wherein if the terminal unit is not capable of automatically setting up a connection in response to receiving said destination identifier then said assistance entity sends the destination identifier to a network node, where the network node then establishes a connection in response to receiving said destination identifier.

20. A method of using a network assisted calling service in a telecommunications network, the method implemented by a terminal unit of a calling party comprising the steps of:

establishing an operative connection with an assistant entity in the telecommunications network;

sending an indication of a destination party to the assistant entity;

if the terminal unit of said calling party is capable of automatically setting UP a connection in response to receiving a destination identifier from the assistant entity, the terminal unit providing an indication of said capability of said terminal unit to said assistance entity;

receiving the destination identifier based on said indication through a signaling channel associated with the operative connection from the assistant entity if said terminal unit is capable of automatically setting up said connection.

21. Method according to claim 20, wherein if the terminal unit is not capable of automatically setting up a connection in response to receiving said destination identifier then said assistance entity sends the destination identifier to a network node, where the network node then establishes a connection to the destination node for the terminal unit in response to receiving said destination identifier.

* * * * *

UNITED STATES PATENT AND TRADEMARK OFFICE
CERTIFICATE OF CORRECTION

| | | |
|---|---|---|
| PATENT NO. | : 8,254,554 B2 | Page 1 of 1 |
| APPLICATION NO. | : 12/094508 | |
| DATED | : August 28, 2012 | |
| INVENTOR(S) | : Noldus | |

It is certified that error appears in the above-identified patent and that said Letters Patent is hereby corrected as shown below:

On the Title Page, in Field (57), under "ABSTRACT", in Column 2, Line 3, delete "destinatin party" and insert -- destination party --, therefor.

In Column 6, Line 58, delete "with a" and insert -- with an --, therefor.

In Column 9, Line 2, in Claim 13, delete "UP" and insert -- up --, therefor.

In Column 10, Line 4, in Claim 18, delete "UP" and insert -- up --, therefor.

In Column 10, Line 26, in Claim 20, delete "UP" and insert -- up --, therefor.

Signed and Sealed this
Thirteenth Day of November, 2012

David J. Kappos
*Director of the United States Patent and Trademark Office*